United States Patent
Finley et al.

(10) Patent No.: US 12,491,010 B2
(45) Date of Patent: Dec. 9, 2025

(54) ROBOT ASSISTED ROD BENDING

(71) Applicant: Nuvasive, Inc., San Diego, CA (US)

(72) Inventors: Eric Finley, San Diego, CA (US); Thomas Scholl, San Diego, CA (US)

(73) Assignee: NuVasive, Inc., San Diego, CA (US)

( * ) Notice: Subject to any disclaimer, the term of this patent is extended or adjusted under 35 U.S.C. 154(b) by 412 days.

(21) Appl. No.: 17/760,636

(22) PCT Filed: Sep. 24, 2020

(86) PCT No.: PCT/US2020/052344
§ 371 (c)(1),
(2) Date: Mar. 15, 2022

(87) PCT Pub. No.: WO2021/061877
PCT Pub. Date: Apr. 1, 2021

(65) Prior Publication Data
US 2022/0330986 A1     Oct. 20, 2022

Related U.S. Application Data

(60) Provisional application No. 62/905,137, filed on Sep. 24, 2019.

(51) Int. Cl.
*A61B 17/70* (2006.01)
*A61B 17/86* (2006.01)
(Continued)

(52) U.S. Cl.
CPC .......... *A61B 17/7002* (2013.01); *A61B 17/86* (2013.01); *A61B 34/20* (2016.02);
(Continued)

(58) Field of Classification Search
CPC . A61B 17/7002; A61B 17/7082; A61B 17/86; A61B 34/10; A61B 34/20;
(Continued)

(56) References Cited

U.S. PATENT DOCUMENTS

RE42,226 E * 3/2011 Foley ................. A61B 17/7083
    600/426
2016/0166335 A1 * 6/2016 Roger .................... A61B 90/37
    606/130
(Continued)

OTHER PUBLICATIONS

PCT Declaration of Non-Establishment of International Search Report for PCT Application No. PCT/US2020/052344 mailed Feb. 10, 2021 (2 pages).
(Continued)

*Primary Examiner* — Jason Holloway
*Assistant Examiner* — Blake A Wood

(57) ABSTRACT

A method for robotic assisted surgery. The method includes capturing a plurality of poses of a surgical tool coupled to a robotic device at a surgical site. The plurality of poses correspond to instances of a final placement of surgical implants at the surgical site. The method also includes determining a plurality of positions of the surgical implants located at the surgical site based on the captured plurality of poses. The method also includes generating a bend curve having a plurality of bend points based on the determined plurality of positions of the surgical implants. The method also includes generating bending instructions for bends to be performed on a linking device configured for attachment to the surgical implants.

20 Claims, 10 Drawing Sheets

(51) Int. Cl.
*A61B 34/00* (2016.01)
*A61B 34/20* (2016.01)
*A61B 34/30* (2016.01)

(52) U.S. Cl.
CPC .............. *A61B 34/25* (2016.02); *A61B 34/30* (2016.02); *A61B 2034/2055* (2016.02)

(58) Field of Classification Search
CPC ................... A61B 34/25; A61B 34/30; A61B 2017/00973; A61B 2034/108; A61B 2034/2055; A61B 2034/2059; A61B 2034/2068; A61B 2090/065; A61B 2090/376
See application file for complete search history.

(56) References Cited

U.S. PATENT DOCUMENTS

2017/0360493 A1* 12/2017 Zucker ..................... B21D 7/14
2019/0038366 A1*  2/2019 Johnson ................. A61B 90/98
2019/0231435 A1*  8/2019 Zucker .................. A61B 17/70

OTHER PUBLICATIONS

PCT Written Opinion for PCT Application No. PCT/US2020/. 052344 mailed Feb. 10, 2021 (5 pages).

* cited by examiner

ROBOT ASSISTED ROD BENDING

CROSS REFERENCE

This application is a National Stage Application of PCT/US2020/052344, filed Sep. 24, 2020, which claims priority to U.S. Provisional Application No. 62/905,137, filed on Sep. 24, 2019, the entire contents of which are incorporated herein by reference in their entirety.

FIELD

This disclosure relates to robotic assisted surgery and to the design and formation of surgical implants such as surgical linking devices.

BACKGROUND

Fixation systems for aligning, adjusting and or fixing, either partially or rigidly, portions of a patient's bony anatomy in a desired spatial relationship relative to each other are frequently used in orthopedic surgery. For example, in spinal surgery for repair or positional adjustment of the vertebrae, it is often necessary that multiple vertebrae are surgically manipulated. As spinal surgery often requires the instrumentation of more bony elements than other areas of orthopedic surgery, the linkage devices can be extremely challenging to design and implant. Treatment for conditions such as scoliosis, spinal injury, disk problems and the like often make use of spinal rod fixation systems for positioning the vertebrae and supporting the spinal motion segments.

A spinal rod needs to be oriented in six degrees of freedom to compensate for the anatomical structure of the particular patient's spine and the particular attachment points or methods for attaching the rods to the vertebrae. In addition, the physiological problem being treated as well as physician's preferences will determine the exact configuration necessary. Accordingly, the size, length and particular bends of each spinal rod depends on the size, number and position of each vertebra to be constrained, their spatial relationship as well as the fixating means, such as pedicle screws, used to hold the rods attached to each vertebra. The relationship of the vertebrae will be different for each patient and the positioning of the patient at the point of installation of the rods. During surgery, the orientation of the spine and vertebrae can be very different than the corresponding position of a patient's upright posture. Rods are bent in one or more anatomic planes measured by distance from each bend, angle of the bend and rotation in relationship to other bend points in order to fit into two or more vertebral anchors.

SUMMARY

In one embodiment, a method for robotic assisted surgery comprises capturing a plurality of poses of a surgical tool coupled to a robotic device at a surgical site. The plurality of poses correspond to instances of a final placement of surgical implants at the surgical site. The method also comprises determining a plurality of positions of the surgical implants located at the surgical site based on the captured plurality of poses. The method also comprises generating a bend curve having a plurality of bend points based on the determined plurality of positions of the surgical implants. The method also comprises generating bending instructions for bends to be performed on a linking device configured for attachment to the surgical implants In another embodiment, a method for robotic assisted surgery comprises capturing a plurality of poses of a surgical tool coupled to a robotic device at a surgical site. The plurality of poses correspond to instances of a final placement of pedicle screws at a plurality of vertebrae. The method also comprises determining a plurality of positions of the pedicle screws located at the plurality of vertebrae based on the captured plurality of poses. The method also comprises generating a bend curve having a plurality of bend points based on the determined plurality of positions of the pedicle screws. The method also comprises generating bending instructions for bends to be performed on a linking device configured for attachment to the pedicle screws.

In another embodiment, a method for robotic assisted surgery comprises capturing, via an imaging system, a plurality of poses of a surgical tool coupled to a robotic device at a surgical site based on infrared signals associated with at least one of the robotic device or the surgical tool coupled to the robotic device. The plurality of poses correspond to instances of a final placement of surgical implants at the surgical site. The method also comprises determining a plurality of positions of the surgical implants located at the surgical site based on the captured plurality of poses. The method also comprises generating a bend curve having a plurality of bend points based on the determined plurality of positions of the surgical implants. The method also comprises generating bending instructions for bends to be performed on a linking device configured for attachment to the surgical implants.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to active the developers' specific goals, such as compliance with system-related and business-related constraints, which will vary from one implementation to another. Moreover, it will be appreciated that such a development effort might be complex and time-consuming, but nevertheless be a routine undertaking for those of ordinary skill in the art having the benefit of this disclosure. It is furthermore to be readily understood that, although discussed below primarily within the context of spinal surgery, the systems and methods of the present invention may be employed in any number of anatomical settings to provide access to any number of different surgical target sites throughout the body.

Figure 1:
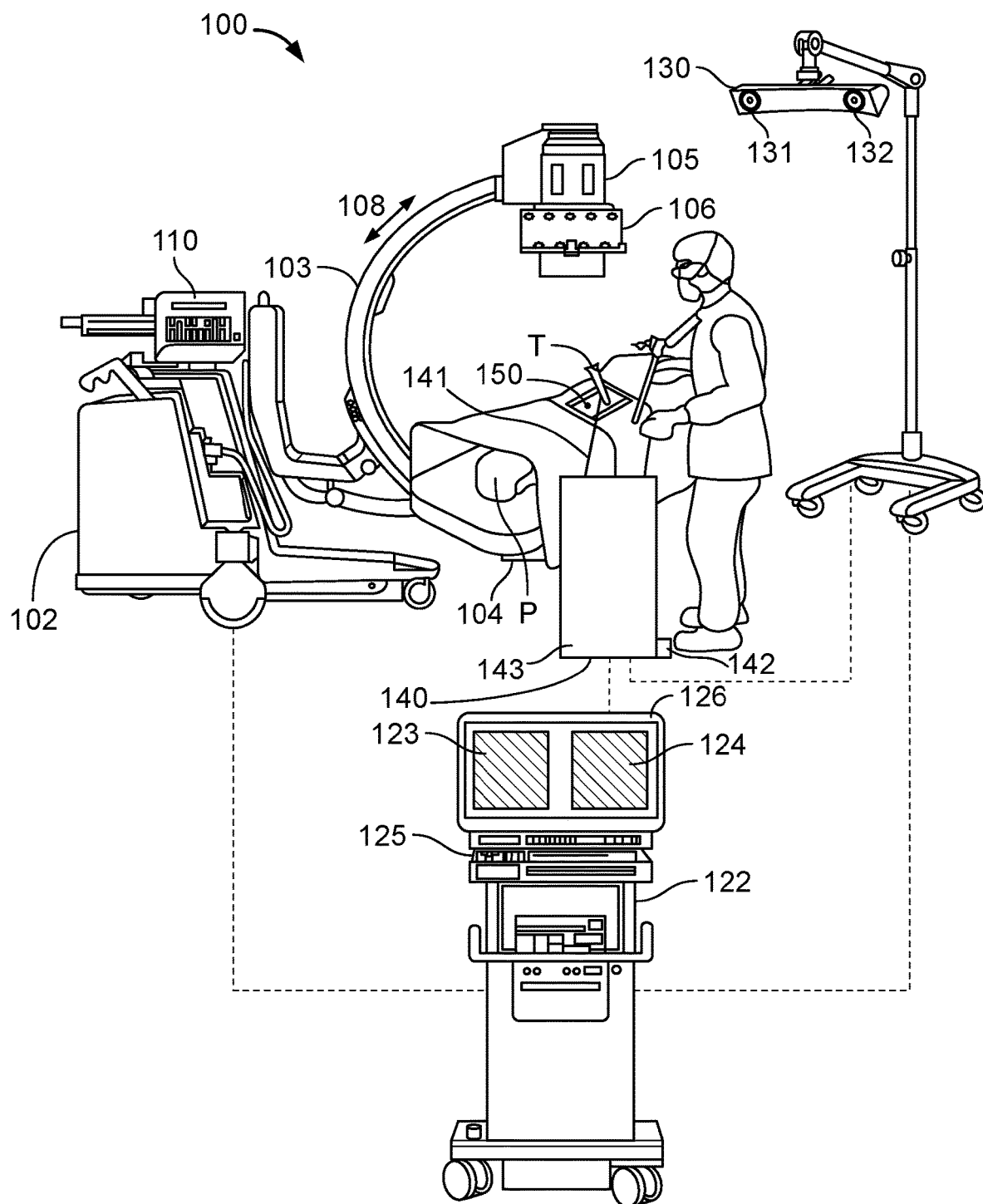
FIG. 1 is a diagram of an example system for performing a surgical procedure, according to an embodiment of the present disclosure.

Referring now to the figures, FIG. 1 is a diagram of an examplary system 100 for performing a surgical procedure. The examplary system 100 includes a base unit 102 supporting a C-Arm imaging device 103. The C-Arm 103 includes a radiation source 104 that is positioned beneath the patient P and that directs a radiation beam upward to the receiver 105. The receiver 105 of the C-Arm 103 transmits image data to a processing device 122. While the exemplary embodiment describes the imaging device as a C-Arm, it is contemplated that other known imaging devices could be used in the system 100 for performing a surgical procedure. The processing device 122 may communicate with a tracking device 130 to obtain position and orientation information of various instruments (e.g., instrument T) used during the surgical procedure. The tracking device 130 may communicate with a robotic device 140 to provide location information of various tracking elements, such as marker 150. The robotic device 140 and the processing device 122 may communicate via one or more communication channels.

The base unit 102 includes a control panel 110 through which a user can control the location of the C-Arm 103, as well as the radiation exposure. The control panel 110 thus permits the radiology technician to "shoot a picture" of the surgical site at a surgeon's direction, control the radiation dose, and initiate a radiation pulse image.

The C-Arm 103 may be rotated about the patient P in the direction of the arrow 108 for different viewing angles of the surgical site. In some instances, implants or instrument T may be situated at the surgical site, necessitating a change in viewing angle for an unobstructed view of the site. Thus, the position of the receiver relative to the patient P, and more particularly relative to the surgical site of interest, may change during a procedure as needed by the surgeon or radiologist. Consequently, the receiver 105 may include a tracking target 106 mounted thereto that allows tracking of the position of the C-Arm 103 using the tracking device 130. By way of example only, the tracking target 106 may include a plurality of infrared (IR) reflectors or emitters spaced around the target, while the tracking device 130 is configured to triangulate the position of the receiver 105 from the IR signals reflected or emitted by the tracking target 106.

The processing device 122 can include a digital memory associated therewith and a processor for executing digital and software instructions. The processing device 122 may also incorporate a frame grabber that uses frame grabber technology to create a digital image for projection as displays 123 and 124 on a display device 126. The displays 123 and 124 are positioned for interactive viewing by the surgeon during the procedure. The two displays 123 and 124 may be used to show images from two views, such as lateral and A/P, or may show a baseline scan and a current scan of the surgical site, or a current scan and a "merged" scan based on a prior baseline scan and a low radiation current scan. An input device 125, such as a keyboard or a touch screen, can allow the surgeon to select and manipulate the on-screen images. It is understood that the input device may incorporate an array of keys or touch screen icons corresponding to the various tasks and features implemented by the processing device 122. The processing device 122 includes a processor that converts the image data obtained from the receiver 105 into a digital format. In some cases, the C-Arm 103 may be operating in the cinematic exposure mode and generating many images each second. In these cases, multiple images can be averaged together over a short time period into a single image to reduce motion artifacts and noise.

The tracking device 130 includes sensors 131 and 132 for determining location data associated with a variety of elements (e.g., an infrared reflector or emitter) used in a surgical procedure. In one example, the sensors 131 and 132 may be a charge-coupled device (CCD) image sensor. In another example, the sensors 131 and 132 may be a complementary metal-oxide-semiconductor (CMOS) image sensor. It is also envisioned that a different number of other image sensors may be used to achieve the functionality described.

In one aspect, the robotic device 140 may assist with holding an instrument T relative to the patient P during a surgical procedure. In one scenario, the robotic device 140 may be configured to maintain the instrument T in a relative position to the patient P as the patient P moves (e.g., due to breathing) or is moved (e.g., due to manipulation of the patient's body) during the surgical procedure.

The robotic device 140 may include a robot arm 141, a pedal 142, and a mobile housing 143. The robotic device 140 may also be in communication with a display 126. The robotic device 140 may also include a fixation device to fix the robotic device 140 to an operating table.

The robot arm 141 may be configured to receive one or more end effectors depending on the surgical procedure and the number of associated joints. In one example, the robot arm 141 may be a six joint arm. In this example, each joint includes an encoder which measures its angular value. The movement data provided by the one or more encoders, combined with the known geometry of the six joints, may allow for the determination of the position of the robot arm 141 and the position of the instrument T coupled to the robot arm 141. It also envisioned that a different number of joints may be used to achieve the functionality described herein.

The mobile housing 143 ensures easy handling of the robotic device 140 through the use of wheels or handles or both. In one embodiment, the mobile housing 143 may include immobilization pads or an equivalent device. The mobile housing 143 may also include a control unit which provides one or more commands to the robot arm 141 and allows a surgeon to manually input data through the use of an interface, such as a touch screen, a mouse, a joystick, a keyboard or similar device.

In one example, the processing device 122 is configured to capture a pose of an instrument T via the tracking device 130. The captured pose of the instrument includes a combination of position information and orientation information. In this example, the pose of the instrument T is based on a user defined placement at a surgical site of the patient P. The user defined placement is based on movement of the instrument T by a surgeon or the robotic device 140 or both. In one scenario, the instrument comprises one or more infrared reflectors or emitters. Continuing with this example, the processing device 122 is configured to determine a range of movement of the instrument T corresponding to the captured pose of the instrument T. The range of movement is associated with the actuation of one or more components (e.g., one or more links and joints) of the robotic device 140. The processing device 122 is configured to determine one or more instructions for actuating the one or more components of the robotic device 140 according to the determined range of movement. Further, the processing device 122 is configured to provide the one or more instructions to the robotic device 140.

In another example, in response to the captured pose of the instrument T, the processing device 122 is configured to determine an axis for pivoting the instrument T and a range of degrees within one or more planes for pivoting the instrument T about the determined axis. In this example, the processing device 122 is configured to provide the one or more instructions to limit a movement to robotic device 140 for pivoting the instrument T coupled to the robotic device 140. The robotic device 140, as described herein, is configured to convert the one or more instructions for enabling the instrument T to be pivoted according to the determined axis and the range of degrees within one or more planes.

Figure 2:
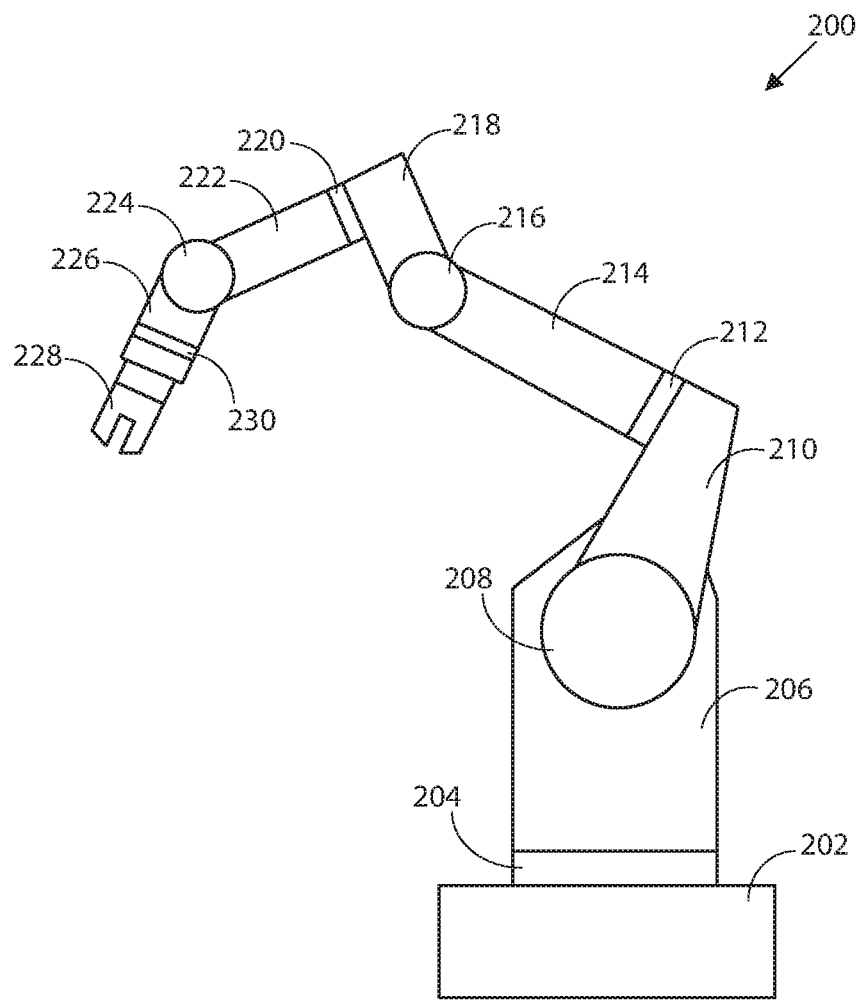
FIG. 2 depicts an example robotic device that may be used during a surgical procedure, according to an embodiment of the present disclosure.

FIG. 2 illustrates an example robotic device 200 that may be used during a surgical procedure. The robotic device 200 may contain hardware, such as a processor, memory or storage, and sensors that enable the robotic device 200 for use in a surgical procedure. The robotic device 200 may be powered by various means such as electric motor, pneumatic motors, hydraulic motors, etc. The robotic device 200 includes a base 202, links 206, 210, 214, 218, 222, and 226, joints 204, 208, 212, 216, 220, 224, and 230, and manipulator 228.

The base 202 may provide a platform in order to provide support for the robotic device 200. The base 202 may be stationary or coupled to wheels in order to provide movement of the robotic device 200. The base 202 may comprise any number of materials such as aluminum, steel, stainless steel, etc., that may be suitable for a given environment associated with the robotic device 200.

The links 206, 210, 214, 218, 222, and 226 may be configured to be moved according to a programmable set of instructions. For instance, the links may be configured to follow a predetermined set of movements (e.g., a limited range of movements based on a captured pose of an instrument) in order to accomplish a task under the supervision of a user. By way of example, the links 206, 210, 214, 218, 222, and 226 may form a kinematic chain that defines relative movement of a given link of links 206, 210, 214, 218, 222, and 226 at a given joint of the joints 204, 208, 212, 216, 220, 224, and 230.

The joints 204, 208, 212, 216, 220, 224, and 230 may be configured to rotate through the use of a mechanical gear system. In one example, the mechanical gear system is driven by a strain wave gearing, a cycloid drive, etc. The mechanical gear system selected would depend on a number of factors related to the operation of the robotic device 200 such as the length of the given link of the links 206, 210, 214, 218, 222, and 226, speed of rotation, desired gear reduction, etc. Providing power to the joints 204, 208, 212, 216, 220, 224, and 230 will allow for the links 206, 210, 214, 218, 222, and 226 to be moved in a way that allows the manipulator 228 to interact with an environment.

In one example, the manipulator 228 is configured to allow the robotic device 200 to interact with the environment according to one or more constraints. In one example, the manipulator 228 performs appropriate placement of an element through various operations such as gripping a surgical instrument. By way of example, the manipulator 228 may be exchanged for another end effector that would provide the robotic device 200 with different functionality.

In one example, the robotic device 200 is configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications.

Figure 3:
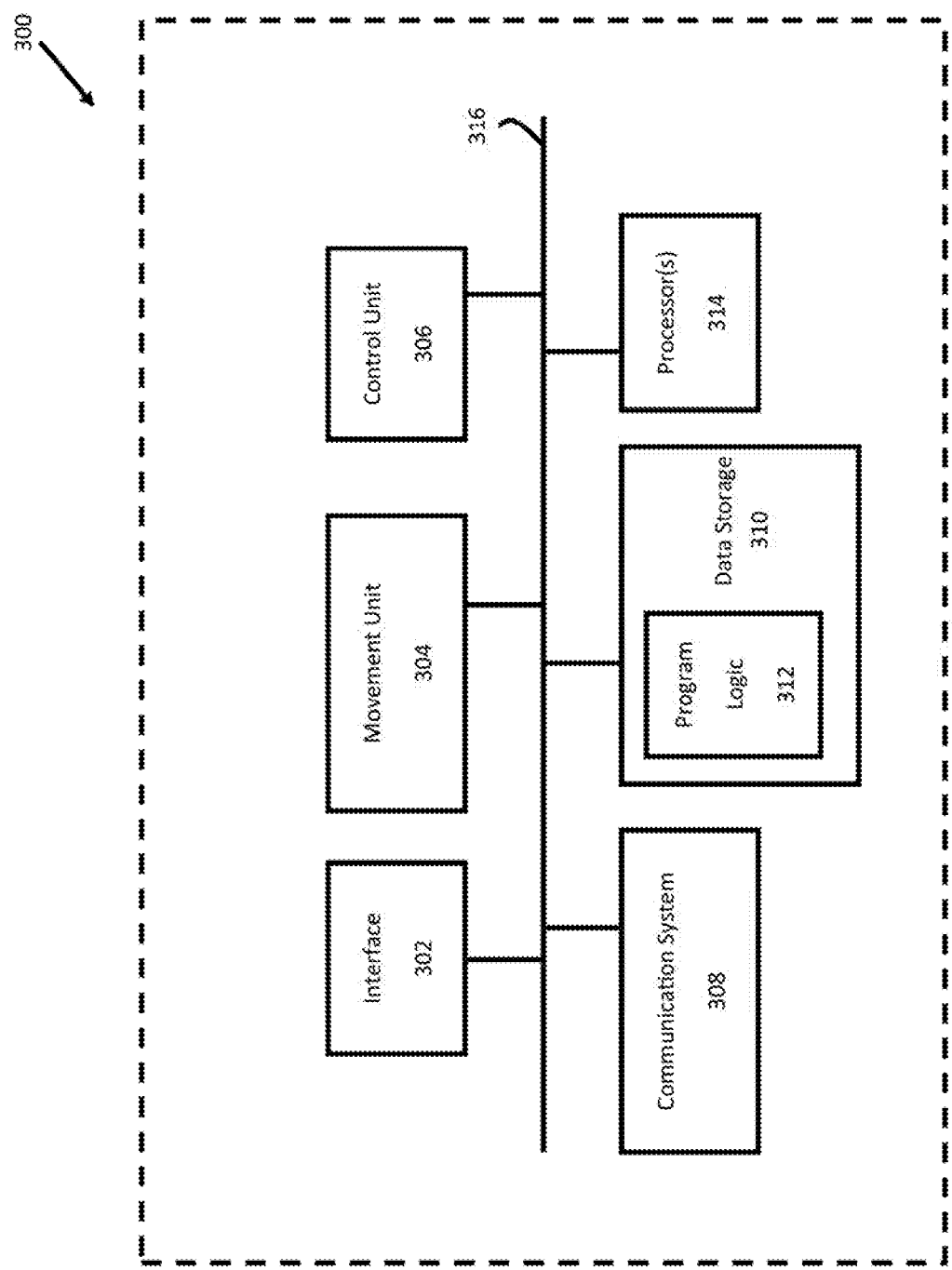
FIG. 3 depicts a block diagram of a computing device, according to an embodiment of the present disclosure.

FIG. 3 is a block diagram of a computing device 300, according to an example embodiment. In some examples, some components illustrated in FIG. 3 may be distributed across multiple computing devices (e.g., desktop computers, servers, hand-held devices, etc.). However, for the sake of the example, the components are shown and described as part of one example device. The computing device 300 may include an interface 302, a movement unit 304, a control unit 306, a communication system 308, a data storage 310, and a processor 314. Components illustrated in FIG. 3 may be linked together by a communication link 316. In some examples, the computing device 300 may include hardware to enable communication within the computing device 300 and another computing device (not shown). In one embodiment, the robotic device 140 or the robotic device 200 may include the computing device 300.

The interface 302 may be configured to allow the computing device 300 to communicate with another computing device (not shown). Thus, the interface 302 may be configured to receive input data from one or more devices. In some examples, the interface 302 may also maintain and manage records of data received and sent by the computing device 300. In other examples, records of data may be maintained and managed by other components of the computing device 300. The interface 302 may also include a receiver and transmitter to receive and send data. In some examples, the interface 302 may also include a user-interface, such as a keyboard, microphone, touch screen, etc., to receive inputs as well. Further, in some examples, the interface 302 may also interface with output devices such as a display, speaker, etc.

In one example, the interface 302 may receive an input indicative of location information corresponding to one or more elements of an environment in which a robotic device (e.g., robotic device 140, robotic device 200) resides. In this example, the environment may be an operating room in a hospital comprising a robotic device configured to function during a surgical procedure. The interface 302 may also be configured to receive information associated with the robotic device. For instance, the information associated with the robotic device may include operational characteristics of the robotic device and a range of motion with one or more components (e.g., joints 204, 208, 212, 216, 220, 224, and 230) of the robotic device (e.g., robotic device 140, robotic device 200).

The control unit 306 of the computing device 300 may be configured to run control software which exchanges data with components (e.g., robot arm 141, robot pedal 142, joints 204, 208, 212, 216, 220, 224, and 230, manipulator 228, etc.) of a robotic device (e.g., robotic device 140, robotic device 200) and one or more other devices (e.g., processing device 122, tracking device 130, etc.). The control software may communicate with a user through a user interface and display monitor (e.g., display 126) in communication with the robotic device. The control software may also communicate with the tracking device 130 and the processing device 122 through a wired communication interface (e.g., parallel port, USB, etc.) and/or a wireless communication interface (e.g., antenna, transceivers, etc.). The control software may communicate with one or more sensors to measure the efforts exerted by the user at the instrument T mounted to a robot arm (e.g., robot arm 141, link 226). The control software may communicate with the robot arm to control the position of the robot arm relative to the marker 150.

As described above, the control software may be in communication with the tracking device 130. In one scenario, the tracking device 130 may be configured to track the marker 150 that is attached to the patient P. By way of example, the marker 150 may be attached to a spinous process of a vertebra of the patient P. In this example, the marker 150 may include one or more infrared reflectors that are visible to the tracking device 130 to determine the location of the marker 150. In another example, multiple markers may be attached to one or more vertebrae and used to determine the location of the instrument T.

In one example, the tracking device 130 may provide updates in near real-time of the location information of the marker 150 to the control software of the robotic device 140. The robotic device 140 may be configured to receive updates to the location information of the marker 150 from the tracking device 130 via a wired and/or wireless interface. Based on the received updates to the location information of the marker 150, the robotic device 140 may be configured to determine one or more adjustments to a first position of the instrument T in order to maintain a desired position of the instrument T relative to the patient P.

In one embodiment, the control software may include independent modules. In an exemplary embodiment, these independent modules run simultaneously under a real time environment and use a shared memory to ensure management of the various tasks of the control software. The modules may have different priorities, such as a safety module having the highest priority, for example. The safety module may monitor the status of the robotic device 140. In one scenario, the safety module may send an instruction to the control unit 306 to stop the robot arm 141 when a critical situation is detected, such as an emergency stop, software failure, or collision with an obstacle, for example.

In one example, the interface 302 is configured to allow the robotic device 140 to communicate with other devices (e.g., processing device 122, tracking device 130). Thus, the interface 302 is configured to receive input data from one or more devices. In some examples, the interface 302 may also maintain and manage records of data received and sent by other devices. In other examples, the interface 302 may use a receiver and transmitter to receive and send data.

The interface 302 may be configured to manage the communication between a user and control software through a user interface and display screen (e.g., via displays 123 and 124). The display screen may display a graphical interface that guides the user through the different modes associated with the robotic device 140. The user interface may enable the user to control movement of the robot arm 141 associated with the beginning of a surgical procedure, activate a given mode to be used during a surgical procedure, and stop the robot arm 141 if needed, for example.

The movement unit 304 may be configured to determine the movement associated with one or more components of the robot arm 141 to perform a given procedure. In one embodiment, the movement unit 304 may be configured to determine the trajectory of the robot arm 141 using forward and inverse kinematics. In one scenario, the movement unit 304 may access one or more software libraries to determine the trajectory of the robot arm 141. In another example, the movement unit 304 is configured to receive one or more instructions for actuating the one or more components of the robotic device 140 from the processing device 122 according to a determined range of movement of a surgical tool at a surgical site.

The movement unit 304 may include a force module to monitor the forces and torques measured by one or more sensors coupled to the robot arm 141. In one scenario, the force module may be able to detect a collision with an obstacle and alert the safety module.

The control unit 306 may be configured to manage the functions associated with various components (e.g., robot arm 141, pedal 142, etc.) of the robotic device 140. For example, the control unit 306 may send one or more commands to maintain a desired position of the robot arm 141 relative to the marker 150. The control unit 306 may be configured to receive movement data from a movement unit 304.

In one scenario, the control unit 306 can instruct the robot arm 141 to function according to a cooperative mode. In the cooperative mode, a user is able to move the robot arm 141 manually by holding the tool T coupled to the robot arm 141 and moving the instrument T to a desired position. In one example, the robotic device 140 may include one or more force sensors coupled to an end effector of the robot arm 141. By way of example, when the user grabs the instrument T and begins to move it in a direction, the control unit 306 receives efforts measured by the force sensor and combines them with the position of the robot arm 141 to generate the movement desired by the user.

In one scenario, the control unit 306 can instruct the robot arm 141 to function according to a given mode that will cause the robotic device 140 to maintain a relative position of the instrument T to a given IR reflector or emitters (e.g., the marker 150). In one example, the robotic device 140 may receive updated position information of the marker 150 from the tracking device 130 and adjust as necessary. In this example, the movement unit 304 may determine, based on the received updated position information of the marker 150, which joint(s) of the robot arm 141 need to move in order to maintain the relative position of the instrument T with the marker 150.

In another scenario, a restrictive cooperative mode may be defined by a user to restrict movements of the robotic device 140. For the example, the control unit 306 may restrict movements of the robot arm 141 to a plane or an axis, according to user preference. In another example, the robotic device 140 may receive information pertaining to one or more predetermined boundaries within the surgical site that should not intersect with a surgical tool or implant based on a user guided movement of the robot arm 141.

In one embodiment, the robotic device 140 may be in communication with the processing device 122. In one example, the robotic device 140 may provide the position and orientation data of the instrument T to the processing device 122. In this example, the processing device 122 may be configured to store the position and orientation data of the instrument T for further processing. In one scenario, the image processing device 122 may use the received position and orientation data of the instrument T to overlay a virtual representation of the instrument T on display 126.

In one embodiment, a sensor configured to detect a pressure or force may be coupled to the last joint of the robot arm (e.g., link 226). Based on a given movement of the robot arm, the sensor may provide a reading of the pressure exerted on the last joint of the robot arm to a computing device (e.g., a control unit of the robotic device). In one example, the robotic device may be configured to communicate the force or pressure data to a computing device (e.g., processing device 122). In another embodiment, the sensor may be coupled to an instrument such as a retractor. In this embodiment, the force or pressure exerted on the retractor and detected by the sensor may be provided to the robotic device (e.g., robotic device 140, robotic device 200) or a computing device (e.g., processing device 122) or both for further analysis.

In one scenario, the robotic device may access movement data stored in a memory of the robotic device to retrace a movement along a determined motion path. In one example, the robotic device may be configured to move the surgical tool along the determined motion path to reach or move away from the surgical site.

In another scenario, once the instrument coupled to a robot arm (e.g., robot arm 141, links 206, 210, 214, 218, 222, and 226) of a robotic device reaches a desired pedicle screw trajectory, the robotic device may be configured to receive an input from the surgeon to travel along the desired pedicle screw trajectory. In one example, the surgeon may provide an input to the robotic device (e.g., depressing the pedal 142) to confirm the surgeon's decision to enable the robotic device to travel along the desired pedicle screw trajectory. In another example, a user may provide another form of input to either the robotic device or the computing device to assist with movement of an instrument along a determined motion path.

In one scenario, once the robotic device has received confirmation to travel along the desired pedicle screw trajectory, the robotic device may receive instructions from the movement unit 304 to pivot from the current trajectory to the desired pedicle screw trajectory. The movement unit 304 may provide the control unit 306 the required movement data to enable the robotic device to move along the desired pedicle screw trajectory.

In another aspect, a robotic device (e.g., robotic device 140, robotic device 200) may be configured to pivot about an area of significance based on the captured pose of a surgical tool (e.g., instrument T). For example, the robotic device may be configured to pivot a retractor about the tip of the retractor so that all the steps associated with retraction of soft tissue do not need to be repeated. In one example, the movement unit 304 may determine the trajectory required to pivot the retractor.

In one example, the robotic device may be coupled to a retractor that is holding soft tissue away from a surgical site. In this example, a surgeon may need to slightly reposition the retractor due to a patient movement. To do so, the surgeon may activate a mode on the robotic device that causes the retractor to pivot by moving the robot arm (e.g., robot arm 141, links 206, 210, 214, 218, 222, and 226) according to a trajectory determined by the movement unit 304. In one example, a user may input the direction and amount of movement desired via a computing device (e.g., the processing device 122, computing device 300). After the direction and amount of movement have been entered, the user (e.g., a surgeon) may interface with the robotic device (e.g., depress the pedal 142) to begin the movement of the instrument coupled to the robot arm. In one example, the robotic device may allow a user to view a different aspect of the anatomy without disengaging from a docking point.

In another example, the movement unit 304 may provide one or more trajectories for moving the surgical tool (e.g., instrument T) based on the captured pose of the surgical tool to a computing device (e.g., processing device 122) for display on display 126. In this example, a user may choose from one or more limited movements associated with a given step of a surgical procedure. For example, the one or more limited movements may be associated with a specific direction and amount of movement to be performed through the use of one or more buttons coupled to the robotic device 140 and by an individual applying a force to a portion of the robotic device 140.

In one scenario, the robot arm of the robotic device may be coupled to an instrument such as a dilator. In this scenario, the robotic device may receive one or more commands to pivot about the distal end of the dilator by a predetermined amount of degrees. The movement unit 304 may be configured to determine the trajectory necessary to perform the pivot and provide the determined trajectory information to the control unit 306 for moving the robotic device.

In another aspect, one or more infrared (IR) reflectors or emitters may be coupled to a robot arm (e.g., robot arm 141, links 206, 210, 214, 218, 222, and 226) of the robotic device (e.g., robotic device 140, robotic device 200). In one scenario, the tracking device 130 may be configured to determine the location of the one or more IR reflectors or emitters prior to beginning operation of the robotic device. In this scenario, the tracking device 130 may provide the location information of the one or more IR reflectors or emitters to a computing device (e.g., processing device 122, computing device 300) for further processing.

In one example, the processing device 122 or computing device 300 may be configured to compare the location information of the one or more IR reflectors or emitters coupled to the robot arm with data stored on a local or remote database that contains information about the robotic device (e.g., a geometric model of the robotic device) to assist in determining a location or position of the robot arm. In one example, the processing device 122 may determine a first position of the robot arm from information provided by the tracking device 130. In this example, the processing device 122 may provide the determined first position of the robot arm to the robotic device or a computing device (e.g., computing device 300). In one example, the robotic device may use the received first position data to perform a calibration of one or more elements (e.g., encoders, actuators) associated with the one or more joints of the robot arm.

In one scenario, an instrument coupled to the robot arm of the robotic device may be used to determine a difference between an expected tip location of the instrument and the actual tip location of the instrument. In this scenario, the robotic device may proceed to move the instrument to a known location by the tracking device 130 so that the tip of the tool is in contact with the known location. The tracking device 130 may capture the location information corresponding to the one or more IR reflectors or emitters coupled to the robot arm and provide that information to the robotic device or a computing device (e.g., processing device 122, computing device 300). Further, either the robotic device or the computing device may be configured to adjust a coordinate system offset between the robotic device and the tracking device 130 based on the expected tip location of the tool and the actual tip location of the tool.

In another aspect, a force or pressure sensor may be coupled to a robot arm (e.g., robot arm 141, links 206, 210, 214, 218, 222, and 226) of a robotic device (e.g., robotic device 140, robotic device 200). In one example, the force or pressure sensor may be located on an end effector of the robot arm. In another example, the force or pressure sensor may be coupled to a given joint of the robotic arm. The force or pressure sensor may be configured to determine when a force or pressure reading is above a resting threshold. The resting threshold may be based on a force or pressure experienced at the sensor when the end effector is holding the instrument without any additional forces or pressure applied to the instrument (e.g., a user attempting to move the instrument). In one example, the robot arm may stop moving if the force or pressure reading is at or below the resting threshold.

In one example, the movement of the robot arm 141 may be controlled by depression of the pedal 142. For example, while the pedal 142 is depressed, the control unit 306 and the movement unit 304 may be configured to receive any measures of force or pressure from the one or more force sensors and used the received information to determine the trajectory of the robot arm 141.

In another example, the movement of the robot arm 141 may be regulated by how much the pedal 142 is depressed. For example, if the user depresses the pedal 142 to the full amount, the robot arm 141 may move with a higher speed compared to when the pedal 142 is depressed at half the amount. In another example, the movement of the robot arm 141 may be controlled by a user interface located on the robotic device.

In one example, the robotic device (e.g., robotic device 140, robotic device 200) may be configured to store, in a local or remote memory, movement data that corresponds to a determined range of movement associated with a surgical tool. In this example, the robotic device may be configured to only travel in one or more directions as defined by the determined range of movement.

In another example, the instrument coupled to the robot arm may include a switch that is in communication with the robotic device. The switch may be in the form of a button that provides a signal to the robotic device to move the robot arm according to the force detected by the force or pressure sensors associated with the end effector or one or more joints of the robot arm. In this example, when the surgeon lets go of the switch, the robotic device will interpret that action as a stopping command and maintain the position of the instrument.

In one example, the surgeon may incorporate the use of a three-dimensional image of the spine and define one or more planes that the instrument should not traverse. In this example, despite force or pressure sensor detecting a force to move the instrument, the robot arm will not allow the surgeon to move the instrument past the defined one or more planes according to the constraints associated with the predefined plan. By way of example, the robotic device may be configured to provide an alert to the surgeon as the instrument approaches the one or more restricted planes.

In another aspect, a robotic device (e.g., robotic device 140, robotic device 200) may be used to navigate one or more surgical instruments and provide the navigation information to a computing device (e.g., processing device 122, computing device 300) for further processing. In one example, the computing device may be configured to determine a virtual representation of the surgical instrument. Further, the computing device may be configured to overlay the virtual representation of the surgical instrument on a two-dimensional or three-dimensional image of the surgical site.

In one example, the robotic device may perform a calibration procedure between the tracking device 130 in order to remove the dependence on the tracking device 130 for location information in the event that a line of sight between the robotic device and the tracking device 130 is blocked. In one example, using a robotic device which has been registered to a navigation system, as described herein, and a patient's three-dimensional image that corresponds to the surgical site may allow the robotic device to become independent of the degradation of accuracy with distance associated with the tracking device 130.

The communication system 308 may include a wired communication interface (e.g., parallel port, USB, etc.) and/or a wireless communication interface (e.g., antenna, transceivers, etc.) to receive and/or provide signals from/to external devices. In some examples, the communication system 308 may receive instructions for operation of the processing device 122. Additionally or alternatively, in some examples, the communication system 308 may provide output data.

The data storage 310 may store program logic 312 that can be accessed and executed by the processor(s) 314. The program logic 312 may contain instructions that provide control to one or more components of the processing device 122, the robotic device 140, the robotic device 200, etc. For example, program logic 312 may provide instructions that adjust the operation of the robotic device 200 based one on or more user defined trajectories associated with a portable instrument. The data storage 310 may comprise one or more volatile and/or one or more non-volatile storage components, such as optical, magnetic, and/or organic storage, and the data storage may be integrated in whole or in part with the processor(s) 314.

The processor(s) 314 may comprise one or more general-purpose processors and/or one or more special-purpose processors. To the extent the processor 314 includes more than one processor, such processors may work separately or in combination. For example, a first processor may be configured to operate the movement unit 304, and a second processor of the processors 314 may operate the control unit 306.

Figure 4:
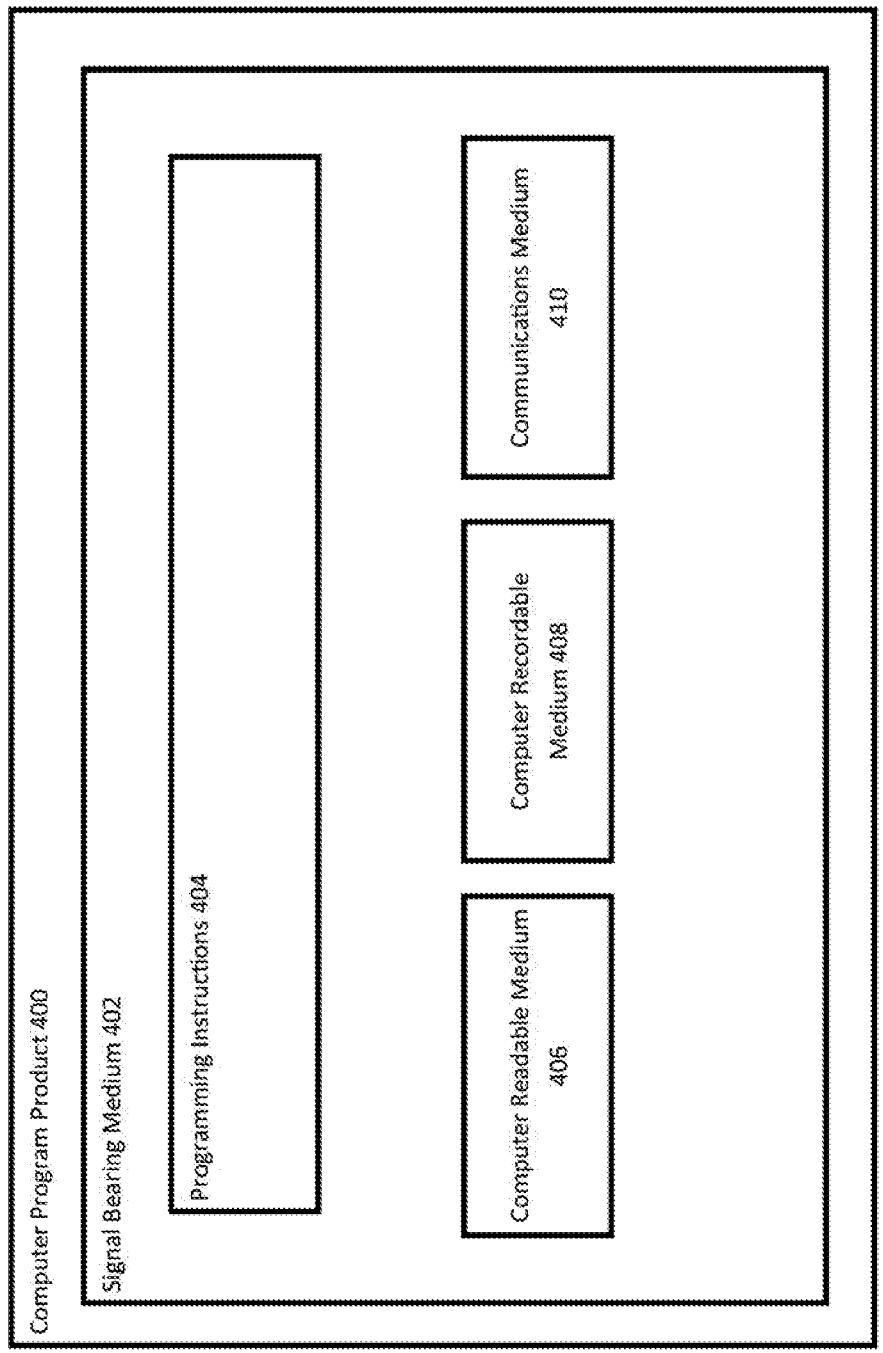
FIG. 4 depicts an example computer readable medium, according to an embodiment of the present disclosure.

FIG. 4 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., functions of the robotic device 140, robotic device 200, etc.) may be implemented by computer program instructions encoded on a computer readable storage media in a machine-readable format, or on other media or articles of manufacture. FIG. 4 is a schematic illustrating a conceptual partial view of an example computer program product that includes a computer program for executing a computer process on a computing device, arranged according to at least some embodiments disclosed herein.

In one embodiment, an example computer program product 400 is provided using a signal bearing medium 402. The signal bearing medium 402 may include one or more programming instructions 404 that, when executed by one or more processors may provide functionality or portions of the functionality described above with respect to FIGS. 1-3. In some examples, the signal bearing medium 402 may be a computer readable medium 406, such as, but not limited to, a hard disk drive, a Compact Disc (CD), a Digital Video Disk (DVD), a digital tape, memory, etc. In some implementations, the signal bearing medium 402 may be a computer recordable medium 408, such as, but not limited to, memory, read/write (R/W) CDs, R/W DVDs, etc. In some implementations, the signal bearing medium 402 may be a communication medium 410 (e.g., a fiber optic cable, a waveguide, a wired communications link, etc.). Thus, for example, the signal bearing medium 402 may be conveyed by a wireless form of the communications medium 410.

The one or more programming instructions 404 may be, for example, computer executable and/or logic implemented instructions. In some examples, a computing device may be configured to provide various operations, functions, or actions in response to the programming instructions 404 conveyed to the computing device by one or more of the computer readable medium 406, the computer recordable medium 408, and/or the communications medium 410.

The computer readable medium 406 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

Figure 5:
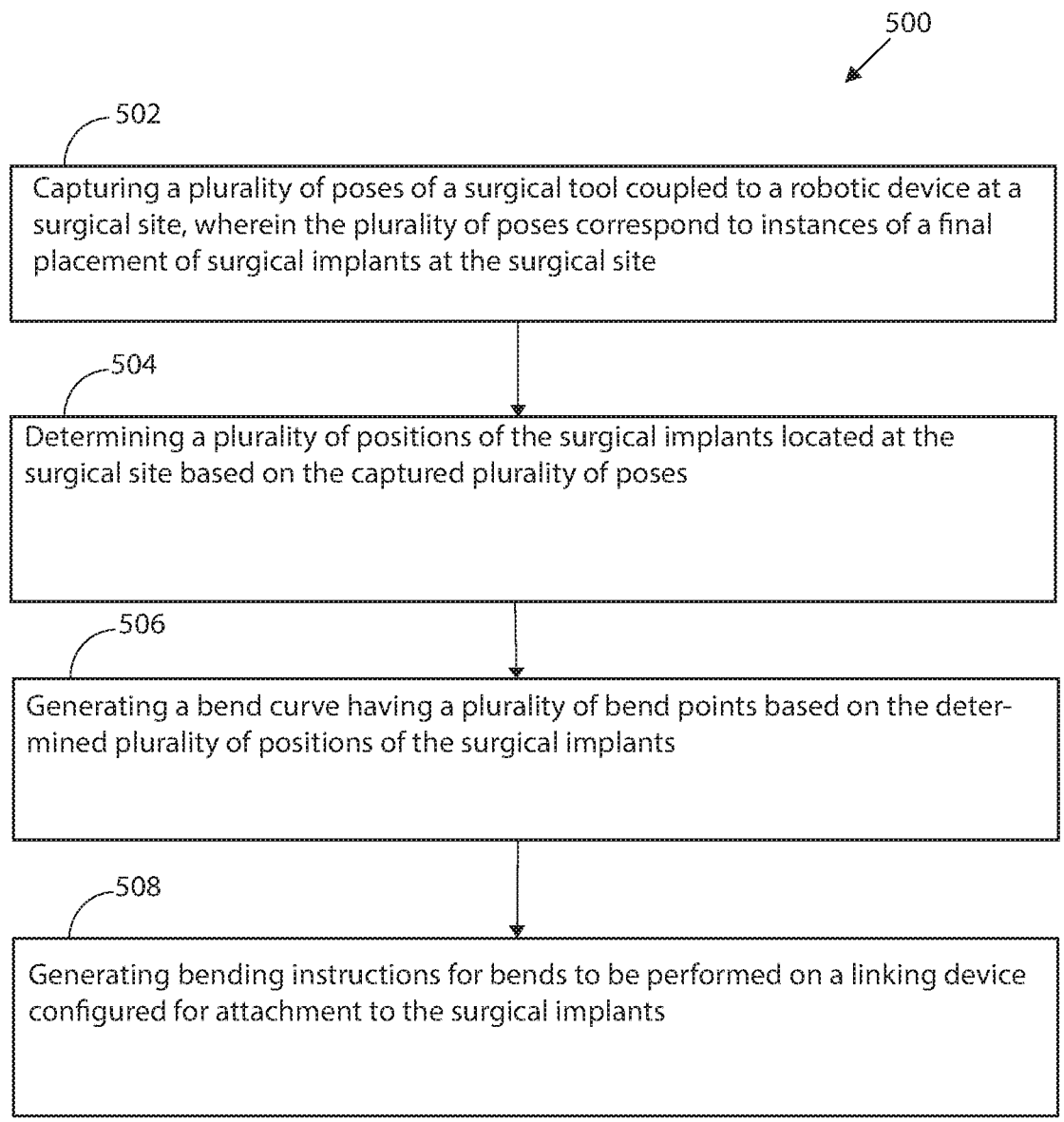
FIG. 5 depicts is flow diagram of an example method, according to an embodiment of the present disclosure.

FIG. 5 is flow diagram of an example method 500, in accordance with at least one embodiment described herein. Although the blocks in FIG. 5 are illustrated in a sequential order, the blocks may in some instances be performed in parallel, and/or in a different order than those described therein. Also, the various blocks may be combined into fewer blocks, divided into additional blocks, and/or removed based upon the desired implementation.

As show by block 502, the method 500 includes capturing a plurality of poses of a surgical tool coupled to a robotic device at a surgical site of a patient. The plurality of poses correspond to instances in time associated with a final placement of surgical implants at the surgical site. In one example, the plurality of poses are captured via an imaging system configured to detect infrared (IR) signals associated with a robotic device or a surgical tool coupled to the robotic or both. In another example, the plurality of poses are captured based on information provided by the robotic device. For example, the information corresponding to the plurality of poses can be based on one or more components (e.g., force sensors, encoders, etc.) of the robotic device that are configured to determine one or more joint angles associated with one or more segments of a robotic arm.

Figure 6:
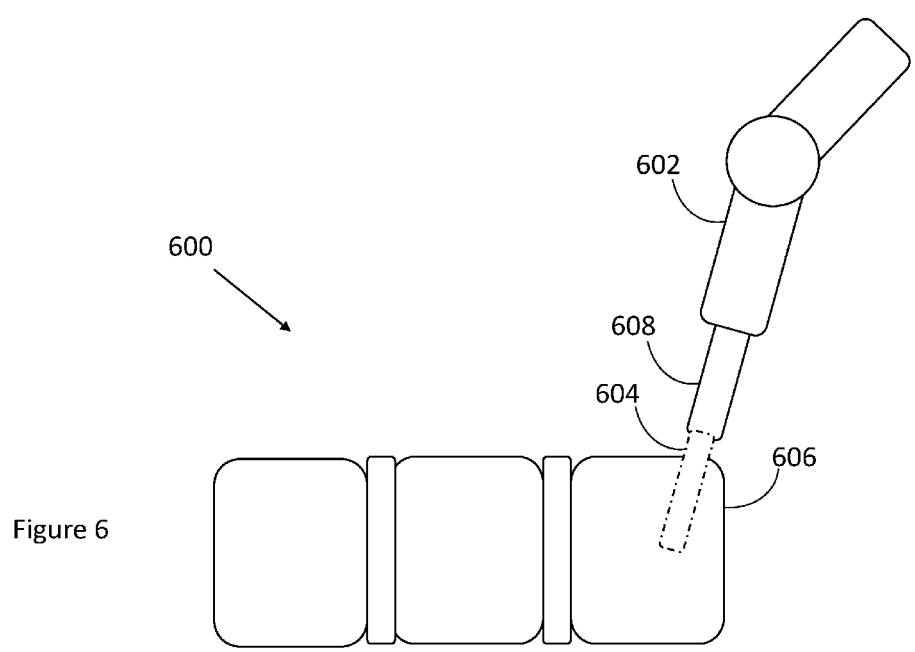
FIG. 6 depicts an example scenario of a robotic device used during a surgical procedure, according to an embodiment of the present disclosure.
Figure 7:
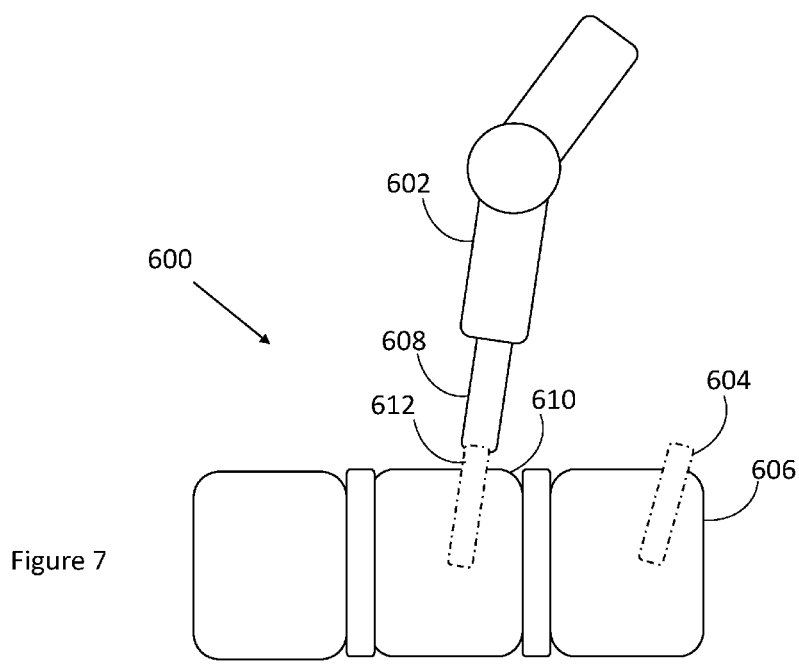
FIG. 7 depicts another example scenario of a robotic device used during a surgical procedure, according to an embodiment of the present disclosure.
Figure 8:
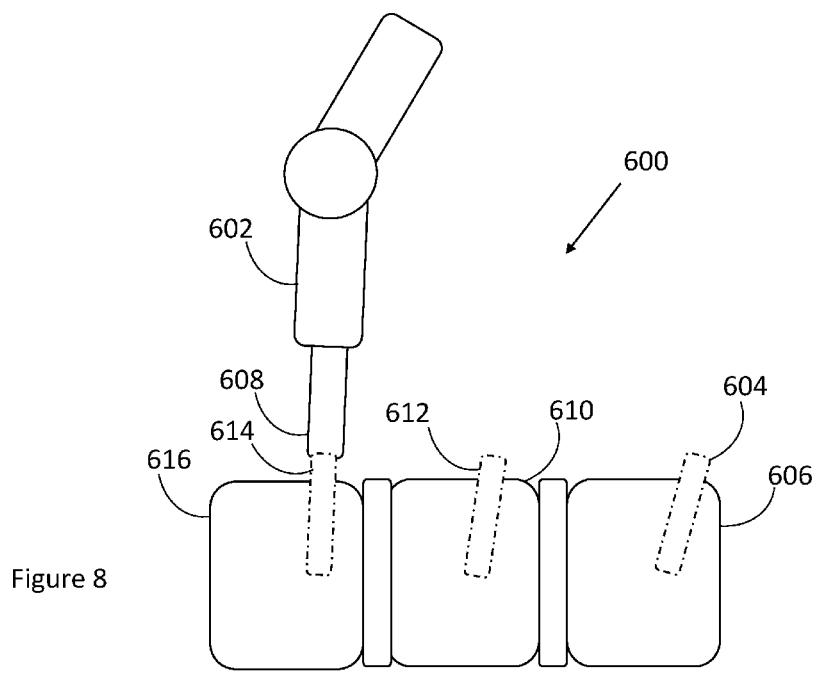
FIG. 8 depicts another example scenario of a robotic device used during a surgical procedure, according to an embodiment of the present disclosure.

In one example, the robotic device may be configured to communicate to a processing system the orientation and position information associated with the one or more segments of the robotic arm during a surgical procedure at a given instance in time that corresponds to the placement of a pedicle screw in a vertebral body of a patient. For example, FIGS. 6-8 illustrate a progression of surgical implants installed at a surgical site of a patient with the assistance of a robotic device. In a first instance of time, FIG. 6 illustrates an example surgical site 600 and a portion of a robotic device 602. The robotic device 602 is configured to operate in a similar manner to robotic device 140 or robotic device 200 as described herein. As shown in FIG. 6, the robotic device 602 is configured to insert a surgical implant 604 within a vertebral body 606. In this instance, the surgical implant 604 is in a final placement and after receiving confirmation from a user, the pose of the surgical tool 608 coupled to the robotic device 602 is captured via at least a tracking device (e.g., tracking device 130) or based on information provided by the robotic device 602. In a second instance of time, FIG. 7 illustrates the example surgical site 600 and robotic device 602 of FIG. 6. In this second instance of time, the surgical implant 612 is in a final placement within vertebral body 610. In a similar manner to the first instance, after receiving confirmation from a user, the pose of the surgical tool 608 coupled to the robotic device 602 is captured. In a third instance of time, FIG. 8 illustrates the example surgical site 600 and robotic device 602 of FIG. 6. In this third instance of time, the surgical implant 614 is in a final placement within vertebral body 616. In a similar manner as described with the first two instances, after receiving confirmation from the user, the pose of the surgical tool 608 coupled to the robotic device 602 is captured.

In one scenario, a user (e.g., surgeon) may guide the surgical tool to the surgical site with assistance by the robotic device. In this scenario, a computing device (e.g., processing device 122) may require an input from the user to confirm that the surgical implant is in a final placement within the surgical site before proceeding with a further step in a given surgical procedure. The confirmation may be an input in the form of a voice command, depression of a button or pedal associated with the robotic device, interaction with a touchscreen, etc. In this scenario, based on the received confirmation, the robotic device is configured to provide the pose corresponding to the final placement of the surgical implant to the computing device. In another scenario, a tracking device is configured to capture the pose of the robotic device based on the received confirmation that the surgical implant is in the final placement.

Referring back to FIG. 5, as shown by block 504, the method 500 also includes determining a plurality of positions of the surgical implants located at the surgical site based on the captured plurality of poses. In one example, the computing device is configured to determine the plurality of positions of the surgical implants based on spatial relationships between a given marker within the surgical site and the captured poses of the robotic device. In another example, the robotic device may use movement information determined by various sensors associated with one or more joints of the robotic device to determine the position of the surgical tool coupled to the robotic device after a calibration procedure between the robotic device and a tracking device (e.g., tracking device 130). In one example, the calibration procedure between the robotic device and the tracking device may remove the dependence on the tracking device for pose data in the event that a line of sight between the robotic device and the tracking device is blocked. In one example, using a robotic device which has been registered to a navigation system and a patient's image that corresponds to the surgical site may allow the robotic device to become independent of the degradation of accuracy with distance associated with the tracking device.

As shown by block 506, the method 500 also includes generating a bend curve according to the determined plurality of positions of the surgical implants. In one example, a computing device can determine the best way to shape, bend or the like, the linking device in order to fit the attachment elements according to the determined plurality of positions of the surgical implants. This determination of bends also takes into consideration the fact that other structures or the shape of the structure being attached to may be in the way of one or more determined bends. For example, in a spinal procedure, the shape of the vertebrae bones must also be considered.

As shown by block 508, the method 500 also includes generating bending instructions for bends to be performed on the linking device configured for attachment to the surgical implants by a bending tool at each of the bend points based on the generated bend curve. In one example, a computing device is programmed to accommodate any number of parameters in determining the output or the final shape of the linking device. In this way, the goals of surgery can be assisted through the alteration of the shape of the linking device. Whereas in one embodiment, the shape dictated by the information above and not altered further could be used to create the linking device, further alterations in the device's shape can help to address, straighten, or alter abnormalities in alignment of the body part(s), create lessen or eliminate deformities, reduce or impose changes in alignment or the addition or elimination of stresses. It is possible to couple the changes in different planes or simply apply correction in one plane, rather than in another orthogonal plane. These modifications of the shaping information that is outputted can be obtained through various means—visual, anatomic, guided by radiographs (intraoperative, preoperative, positioning films, etc.), guided by the material properties of the linking device and the plasticity and/or relative location of the body part(s) being altered.

The computing device need not have direct interaction with the device used for bending, in one embodiment. In other embodiments, it could input the information directly to the shaping device such as to a screen or other means such as to set the dials prior to shaping. The computing device defines mathematically from the spatial location of the attachment means and the bony structure of the body, the heads of screws, surface of that bony body part and the like, a curve which approaches these points in three dimensional space within the requirements and capabilities of the selected surgical linking device. The determined information can be used to select a specific device, to place bends in an unbent or pre-bent device (or shape as needed) or to adjust the attachment means as desired. In addition, a number of different shape solutions could be accommodated such that the surgeon can use personal judgment in selecting the best shape solution.

Figure 9:
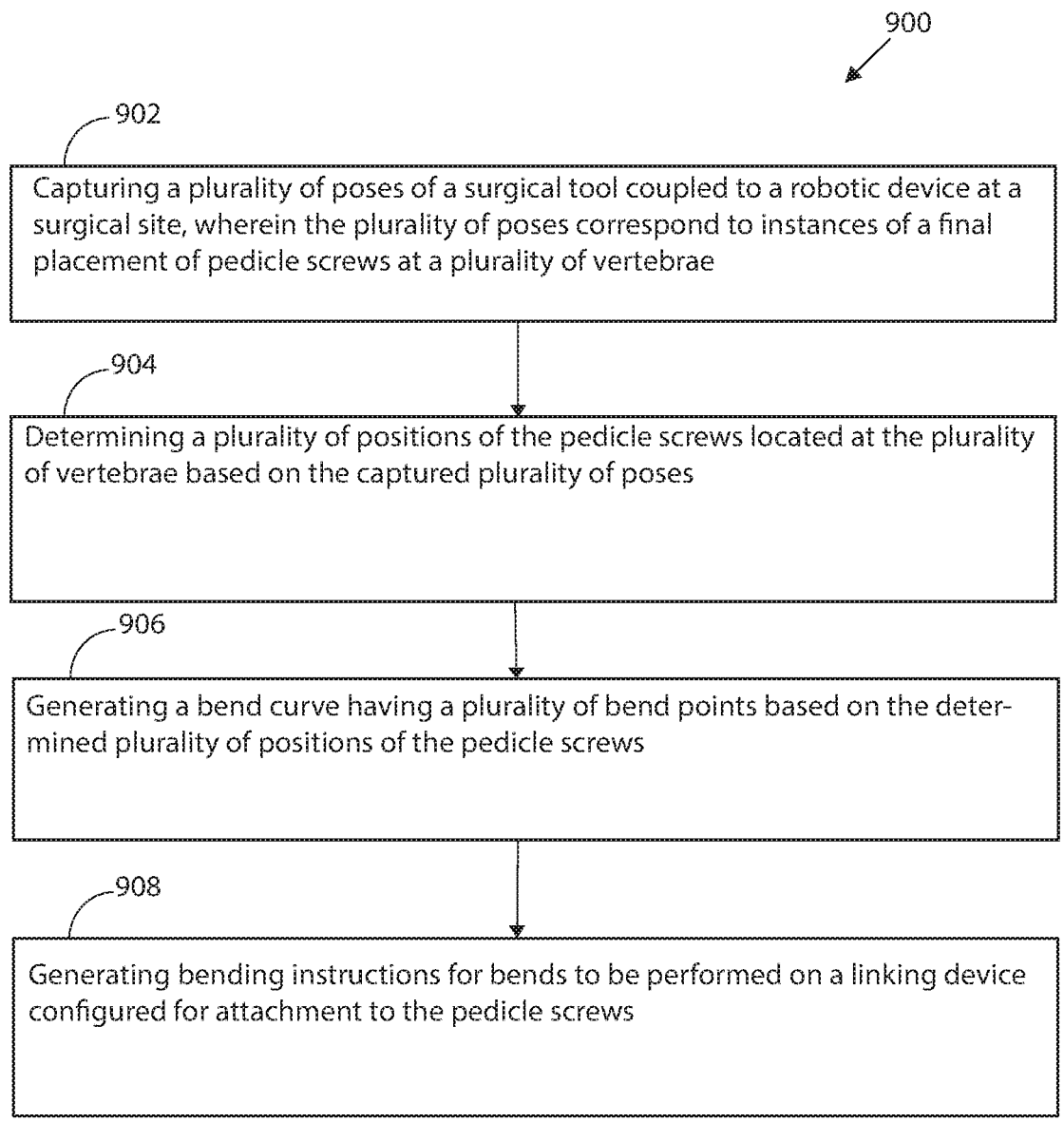
FIG. 9 depicts a flow diagram of another example method, according to an embodiment of the present disclosure.

FIG. 9 is flow diagram of an example method 900, in accordance with at least one embodiment described herein. Although the blocks in FIG. 9 are illustrated in a sequential order, the blocks may in some instances be performed in parallel, and/or in a different order than those described therein. Also, the various blocks may be combined into fewer blocks, divided into additional blocks, and/or removed based upon the desired implementation.

As shown by block 902, the method 900 includes capturing a plurality of poses of a surgical tool coupled to a robotic device at a surgical site. In one example, the plurality of poses correspond to instances of a final placement of pedicle screws at a plurality of vertebrae.

As shown by block 904, the method 900 also includes determining a plurality of positions of the pedicle screws located at the plurality of vertebrae based on the captured plurality of poses.

As shown by block 906, the method 900 also includes generating a bend curve having a plurality of bend points based on the determined plurality of positions of the pedicle screws.

As shown by block 908, the method 900 also includes generating bending instructions for bends to be performed on a linking device configured for attachment to the pedicle screws.

Figure 10:
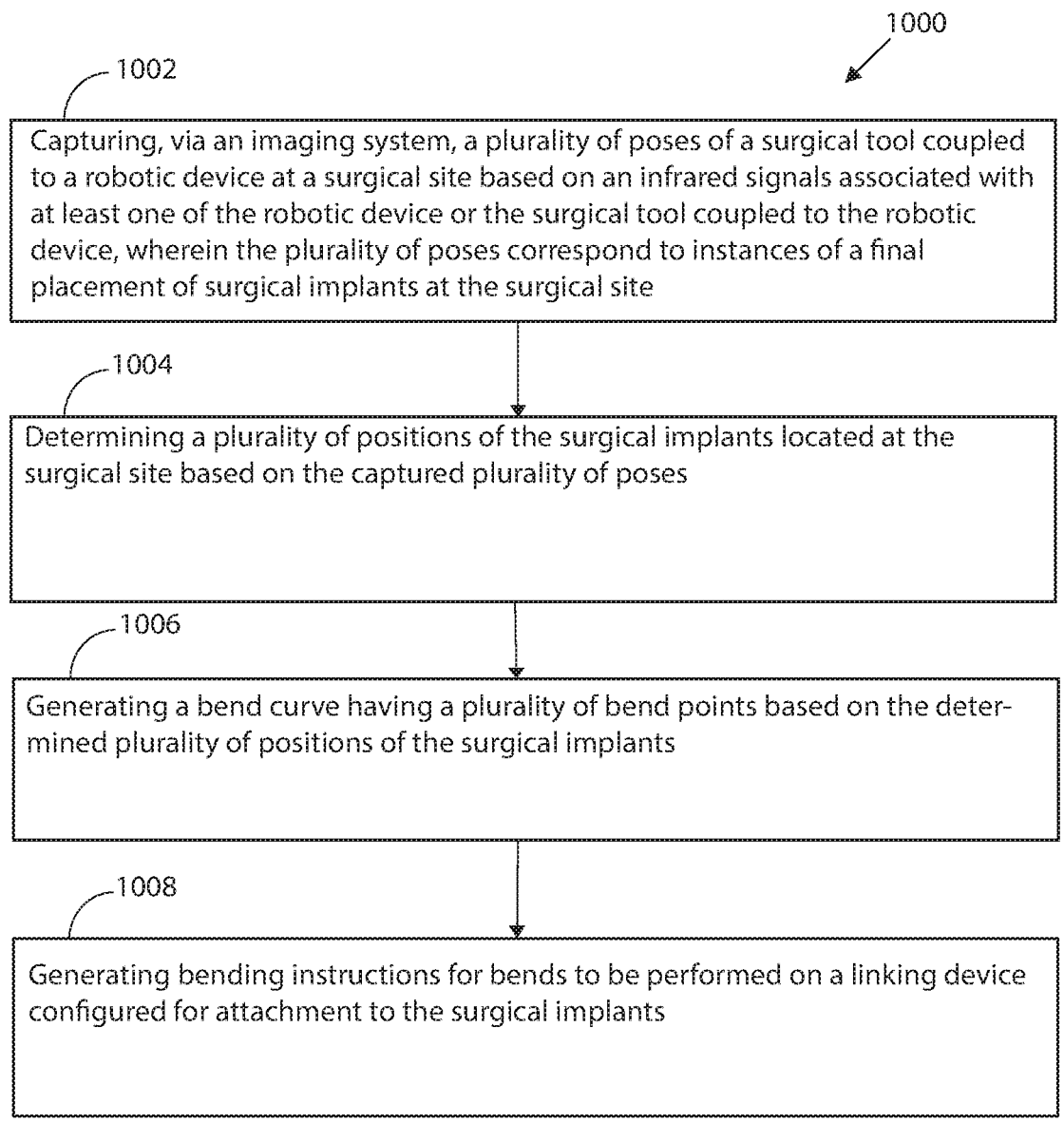
FIG. 10 depicts a flow diagram of another example method, according to an embodiment of the present disclosure.

FIG. 10 is flow diagram of an example method 1000, in accordance with at least one embodiment described herein. Although the blocks in FIG. 10 are illustrated in a sequential order, the blocks may in some instances be performed in parallel, and/or in a different order than those described therein. Also, the various blocks may be combined into fewer blocks, divided into additional blocks, and/or removed based upon the desired implementation.

As shown by block 1002, the method 1000 includes capturing, via an imaging system, a plurality of poses of a surgical tool coupled to a robotic device at a surgical site based on an infrared signals associated with at least one of the robotic device or the surgical tool coupled to the robotic device. In one example, the plurality of poses correspond to instances of a final placement of surgical implants at the surgical site.

As shown by block 1004, the method 1000 also includes determining a plurality of positions of the surgical implants located at the surgical site based on the captured plurality of poses.

As shown by block 1006, the method 1000 also includes generating a bend curve having a plurality of bend points based on the determined plurality of positions of the surgical implants.

As shown by block 1008, the method 1000 also includes generating bending instructions for bends to be performed on a linking device configured for attachment to the surgical implants.

The flow diagrams of FIGS. 5, 9, and 10 show the functionality and operation of possible implementations of the present embodiment. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer-readable media that stores data for short periods of time, such as register memory, processor cache, or Random Access Memory (RAM), and/or persistent long term storage, such as read only memory (ROM), optical or magnetic disks, or compact-disc read only memory (CD-ROM), for example. The computer readable media may be able, or include, any other volatile or non-volatile storage systems. The computer readable medium may be considered a computer readable storage medium, a tangible storage device, or other article of manufacture, for example.

Alternatively, each block in FIGS. 5, 9, and 10 may represent circuitry that is wired to perform the specific logical functions in the process. An illustrative method, such as the one shown in FIGS. 5, 9, and 10, may be carried out in whole in or in part by a component or components in the cloud. However, it should be understood that the example methods may instead be carried out by other entities or combinations of entities (i.e., by other computing devices and/or combination of computer devices), without departing from the scope of the invention. For example, functions of the method of FIGS. 5, 9, and 10 may be fully performed by a computing device (or components of a computing device such as one or more processors), or may be distributed across multiple components of the computing device, across multiple computing devices, and/or across a server.

While the inventive features described herein have been described in terms of a preferred embodiment for achieving the objectives, it will be appreciated by those skilled in the art that variations may be accomplished in view of those teachings without deviating from the spirit or scope of the invention.

What is claimed:

1. A method for robotic assisted surgery, the method comprising:
   providing a robot device for performing a surgical procedure;

providing a processor to actuate the robot device to perform a surgical procedure;

providing an imaging device to capture poses of a patient's anatomy and surgical tools;

using the imaging device, capturing a plurality of poses of a surgical tool coupled to a robotic device at a surgical site, wherein the plurality of poses correspond to instances of a final placement of surgical implants at the surgical site, wherein the surgical implants are pedicle screws and each captured pose represents the pose of the surgical tool coupled to the robotic device and in contact with a corresponding pedicle screw after the pedicle screw has been inserted into a corresponding site in its final placement;

determining a plurality of positions of the surgical implants located at the surgical site based on the captured plurality of poses using the processor, wherein determining a plurality of positions of the surgical implants comprises using movement information determined by various sensors associated with one or more joints of the robotic device to determine the position of the surgical tool coupled to the robotic device after a calibration procedure between the robotic device and a tracking device;

generating a bend curve having a plurality of bend points based on the determined plurality of positions of the surgical implants using the processor;

generating bending instructions for bends to be performed on a linking device configured for attachment to the surgical implants using the processor; and bending the linking device according to the generated bending instructions.

2. The method of claim 1, wherein capturing the plurality of poses of the surgical tool coupled to the robotic device at the surgical site includes:
determining one or more joint angles associated with one or more segments of a robotic arm of the robotic device.

3. The method of claim 1, wherein capturing the plurality of poses of the surgical tool coupled to the robotic device at the surgical site includes:
capturing, via an imaging system, infrared signals associated with the robotic device.

4. The method of claim 1, wherein capturing the plurality of poses of the surgical tool coupled to the robotic device at the surgical site includes:
capturing, via an imaging system, infrared signals associated with the surgical tool coupled to the robotic device.

5. The method of claim 1, wherein capturing the plurality of poses of the surgical tool coupled to the robotic device at the surgical site includes:
capturing, via an imaging system, infrared signals associated with the surgical tool coupled to the robotic device and infrared signals associated with the robotic device.

6. The method of claim 1, wherein the surgical implants comprise at least a screw, wherein the surgical site comprises a plurality of vertebrae.

7. The method of claim 1, wherein capturing the plurality of poses of the surgical tool coupled to the robotic device at the surgical site includes:
receiving a signal indicative of confirmation of a given final placement of a surgical implant.

8. The method of claim 7, wherein the given final placement is based on an input from a user.

9. The method of claim 8, wherein the input comprises at least one of a voice command, depression of a button or pedal associated with the robotic device, and an input received via a touchscreen.

10. The method of claim 1, wherein determining a plurality of positions of the surgical implants located at the surgical site based on the captured plurality of poses includes:
determining one or more spatial relationships between a given marker within the surgical site and capture poses of the robotic device.

11. The method of claim 10, wherein the given marker includes at least a pedicle screw placed by the robotic device in a vertebral body of the patient.

12. A method for robotic assisted surgery, the method comprising:
providing a robot device for performing a surgical procedure;
providing a processor to actuate the robot device to perform a surgical procedure;
providing an imaging device to capture poses of a patient's anatomy and surgical tools;
capturing a plurality of poses of a surgical tool coupled to a robotic device at a surgical site, wherein the plurality of poses correspond to instances of a final placement of pedicle screws at a plurality of vertebrae, wherein each captured pose represents the pose of the surgical tool coupled to the robotic device and in contact with a corresponding pedicle screw after the pedicle screw has been inserted into a corresponding site in its final placement;
determining a plurality of positions of the pedicle screws located at the plurality of vertebrae based on the captured plurality of poses;
generating a bend curve having a plurality of bend points based on the determined plurality of positions of the pedicle screws;
generating bending instructions for bends to be performed on a linking device configured for attachment to the pedicle screws; and
bending the linking device according to the generated bending instructions.

13. The method of claim 12, wherein capturing the plurality of poses of the surgical tool coupled to the robotic device at the surgical site includes:
determining one or more joint angles associated with one or more segments of a robotic arm of the robotic device.

14. The method of claim 12, wherein capturing the plurality of poses of the surgical tool coupled to the robotic device at the surgical site includes:
capturing, via an imaging system, infrared signals associated with the robotic device.

15. The method of claim 12, wherein capturing the plurality of poses of the surgical tool coupled to the robotic device at the surgical site includes:
capturing, via an imaging system, infrared signals associated with the surgical tool coupled to the robotic device.

16. A method for robotic assisted surgery, the method comprising:
providing a robot device for performing a surgical procedure:
providing a processor to actuate the robot device to perform a surgical procedure:
providing an imaging device to capture poses of a patient's anatomy and surgical tools;

capturing, a plurality of poses of a surgical tool coupled to a robotic device at a surgical site based on infrared signals associated with at least one of the robotic device or the surgical tool coupled to the robotic device, wherein the plurality of poses correspond to instances of a final placement of surgical implants at the surgical site, wherein the surgical implants are pedicle screws and each captured pose represents the pose of the surgical tool coupled to the robotic device and in contact with a corresponding pedicle screw after the pedicle screw has been inserted into a corresponding site in its final placement;

determining a plurality of positions of the surgical implants located at the surgical site based on the captured plurality of poses, wherein determining a plurality of positions of the surgical implants comprises using movement information determined by various sensors associated with one or more joints of the robotic device to determine the position of the surgical tool coupled to the robotic device after a calibration procedure between the robotic device and a tracking device;

generating a bend curve having a plurality of bend points based on the determined plurality of positions of the surgical implants;

generating bending instructions for bends to be performed on a linking device configured for attachment to the surgical implants; and bending the linking device according to the generated bending instructions.

17. The method of claim 16, wherein the surgical implants comprise at least a screw, wherein the surgical site comprises a plurality of vertebrae.

18. The method of claim 16, wherein capturing the plurality of poses of the surgical tool coupled to the robotic device at the surgical site includes:

receiving a signal indicative of confirmation of a given final placement of a surgical implant.

19. The method of claim 18, wherein the given final placement is based on an input from a user.

20. The method of claim 16, wherein determining a plurality of positions of the surgical implants located at the surgical site based on the captured plurality of poses includes:

determining one or more spatial relationships between a given marker within the surgical site and capture poses of the robotic device, wherein the given marker includes at least a pedicle screw placed by the robotic device in a vertebral body of the patient.

* * * * *